US012567582B2

(12) United States Patent
Put et al.

(10) Patent No.: US 12,567,582 B2
(45) Date of Patent: Mar. 3, 2026

(54) SILICON-BASED POWDER, ELECTRODE AND BATTERY COMPRISING SUCH A POWDER

(71) Applicant: Umicore, Brussels (BE)

(72) Inventors: Stijn Put, Olen (BE); Nicolas Marx, Olen (BE); Jan Gilleir, Olen (BE); Daniël Nelis, Olen (BE)

(73) Assignee: Umicore, Brussels (BE)

( * ) Notice: Subject to any disclaimer, the term of this patent is extended or adjusted under 35 U.S.C. 154(b) by 432 days.

(21) Appl. No.: 16/967,248

(22) PCT Filed: Feb. 5, 2019

(86) PCT No.: PCT/EP2019/052724
§ 371 (c)(1),
(2) Date: Aug. 4, 2020

(87) PCT Pub. No.: WO2019/154787
PCT Pub. Date: Aug. 15, 2019

(65) Prior Publication Data
US 2021/0036315 A1     Feb. 4, 2021

(30) Foreign Application Priority Data
Feb. 7, 2018   (EP) ..................................... 18155539

(51) Int. Cl.
| | |
|---|---|
| *H01M 4/38* | (2006.01) |
| *H01M 4/134* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/386* (2013.01); *H01M 4/134* (2013.01); *H01M 4/625* (2013.01); *H01M 10/0525* (2013.01); *H01M 2004/021* (2013.01); *H01M 2004/027* (2013.01)

(58) Field of Classification Search
CPC .. H01M 4/386; H01M 4/134; H01M 10/0525; H01M 2004/021; H01M 2004/027
See application file for complete search history.

(56) References Cited

U.S. PATENT DOCUMENTS

| | | | |
|---|---|---|---|
| 10,181,600 B2 | 1/2019 | Scoyer et al. |
| 2013/0136986 A1 | 5/2013 | Scoyer et al. |
| 2013/0260243 A1 | 10/2013 | Ikeda et al. |
| 2013/0266865 A1 | 10/2013 | Kwon et al. |
| 2014/0349190 A1 | 11/2014 | Kang |
| 2015/0044570 A1 | 2/2015 | Kim et al. |
| 2018/0342732 A1 | 11/2018 | Troegel et al. |
| 2019/0198869 A1 | 6/2019 | Park et al. |

FOREIGN PATENT DOCUMENTS

| | | | | |
|---|---|---|---|---|
| CN | 104203822 A | 12/2014 | | |
| EP | 2966037 A1 | 1/2016 | | |
| EP | 2966710 A1 | 1/2016 | | |
| EP | 3133690 A1 | 2/2017 | | |
| JP | 2013534899 A | 9/2013 | | |
| JP | 2013229301 A | 11/2013 | | |
| JP | 201537074 A | 2/2015 | | |
| JP | 2015037074 A | 2/2015 | | |
| JP | 2019532459 A | 11/2019 | | |
| KR | 20150109056 A | 10/2015 | | |
| KR | 20170104235 | * | 9/2017 | |
| TW | 144828 B | 8/2014 | | |
| TW | I448428 B | 8/2014 | | |
| WO | WO-2012000858 A1 | * | 1/2012 | .............. C01B 33/00 |
| WO | WO-2016102097 A1 | * | 6/2016 | .............. C01B 32/00 |
| WO | 2017140642 A1 | 8/2017 | | |
| WO | 2018038535 A2 | 3/2018 | | |

OTHER PUBLICATIONS

Machine translation of KR 20170104235, obtained Apr. 2024 (Year: 2017).*
ISA/KR; International Search Report and Written Opinion for International Patent Application No. PCT/EP2019/052724 dated Mar. 22, 2019, 10 pages.
Di Nunzio, P.E., et al., "Coagulation and Aggregation Model of Silicon Nanoparticles from Laser Pyrolysis", Aerosol Science and Technology, Aug. 2006, vol. 40, No. 9, 12 pages.

* cited by examiner

*Primary Examiner* — Milton I Cano

*Assistant Examiner* — Albert Michael Hilton

(74) *Attorney, Agent, or Firm* — Rimon P.C.; Allyn B. Elliott

(57) ABSTRACT

A silicon-based powder for use in the negative electrode of a battery comprises silicon-based particles. The silicon-based particles have a number-based particle size distribution having a d50, and less than 8.0% of the particles have a size which is larger than twice the d50. The silicon-based powder may be embedded in a matrix to form an active material powder. Preferably d50<150 nm and d10>10 nm. The cycle efficiency of a negative electrode of a battery, made using such a powder, is much improved.

15 Claims, No Drawings

SILICON-BASED POWDER, ELECTRODE AND BATTERY COMPRISING SUCH A POWDER

CROSS-REFERENCE TO RELATED APPLICATIONS

This application is a U.S. National Stage application of International Patent Application No. PCT/EP2019/052724, filed on Feb. 5, 2019, which claims the benefit of European Patent Application No. 18155539.2, filed on Feb. 7, 2018.

The present invention relates to a powder, more specifically for use, either or not after further processing, in an electrode of a battery, and to an electrode and a battery comprising such a powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using materials such as lithium cobalt oxide or lithium nickel manganese cobalt oxide for the cathode and a natural or artificial graphite for the anode.

It is known that one of the important limitative factors influencing a battery's performance and in particular battery's energy density is the material which is involved in electrochemical reactions in the anode. Therefore, to improve the energy density, newer materials based on e.g. tin, aluminium and silicon were investigated and developed during the last decades, such developments being mostly based on the principle of alloying said material with Li during Li incorporation therein during use.

The best candidate seems to be silicon as theoretical capacities of 3579 mAh/g (gravimetric) can be obtained and these capacities are far larger than that of graphite (372 mAh/g) but also those of other candidates.

However, one drawback of using a silicon based material in an anode is its large volume expansion during charging, which is as high as 300% when the lithium ions are fully incorporated, e.g. by alloying or insertion, in this material—a process often called lithiation. The large volume expansion of the silicon-based materials during Li incorporation may induce stresses in the silicon, which in turn could lead to a mechanical degradation of the silicon material.

Repeated periodically during charging and discharging of the Li-ion battery, the repetitive mechanical degradation of the silicon-based material may reduce the life of a battery to an unacceptable level.

In an attempt to alleviate the deleterious effects of the volume change of the silicon, many research studies showed that by reducing the size of the silicon material into submicron or nanosized silicon particles and using these as the negative electrode material for the electrochemical reactions may prove a viable solution.

In order to accommodate the volume change multi-phase particles are usually used. In these multi-phase particles the silicon particles are mixed with a matrix material, usually a carbon-based material or a silicon-based alloy.

Further, a negative effect of silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle, the SEI formation is a self-terminating process that stops as soon as a 'passivation layer' has formed on the silicon surface. However, because of the volume expansion of silicon, both silicon and the SEI may be damaged during charging (lithiation) and discharging (de-lithiation), thereby freeing new silicon surface and leading to a new onset of SEI formation.

In the art, the above lithiation/de-lithiation mechanism is generally quantified by a so-called coulombic efficiency, which is defined as a ratio (in % for a charge-discharge cycle) between the energy removed from a battery during discharge compared with the energy used during charging. Most work on silicon-based anode materials is therefore focused on improving said coulombic efficiency.

The cumulation of the deviation from 100% coulombic efficiency over many cycles determines a battery's usable life. Therefore, in simple terms, an anode having a coulombic efficiency of 99.9% is twice as good as an anode having a coulombic efficiency of 99.8%.

The invention concerns a silicon-based powder for use in the negative electrode of a battery, whereby the silicon-based powder comprises silicon-based particles, and preferably consists of silicon-based particles, whereby the silicon-based particles have a number-based particle size distribution having a d50, whereby the particle size of a particle is considered to be the largest linear dimension of said particle, whereby less than 8.0% of the total number of silicon-based particles have a particle size which is larger than twice the d50.

The advantage of the invention is that it allows the preparation of anodes having a higher coulombic efficiency.

Without being bound by theory the inventors speculate that this may be linked to the fact that larger particles are more susceptible to fracturing due to the mechanical stresses during repeated swelling and shrinking during use, and thereby contribute disproportionately to continuous SEI formation. The near-absence of large particles, defined as larger than twice the average size, is therefore beneficial.

Relatively narrow particles size distributions have been used before. For instance, KR 2015 0109056 discloses a narrow particle size distribution, especially focusing that very fine particles are absent, but still having a significant fraction of relatively coarse particles. Also, EP 2966710 discloses a fine silicon powder having a d50 of 154 nm. In this powder circa 10% of the particles are larger than three times the d50 value, so this powder also has a significant coarse fraction. Also EP 3133690 discloses silicon powders with a relatively narrow particle size distribution, but without any particular focus on the coarse fraction.

Additionally, lithium incorporation in larger particles, especially into the centre of these, is relatively slow, as this is a diffusion-limited process. As a consequence, larger particles are suspected to be related to limitations in the charge and discharge rates that can be achieved, so that their near-absence is also helpful in improving the capacity at high charge and discharge rates.

In order to obtain the stated advantages to a higher degree, preferably less than 6.0% of the total number of silicon-based particles have a particle size which is larger than twice the d50, more preferably less than 5.0% of the total number of silicon-based particles have a particle size which is larger than twice the d50, yet more preferably less than 4% of the total number of silicon-based particles have a particle size which is larger than twice the d50, even more preferably less than 3.0% of the total number of silicon-based particles have a particle size which is larger than twice the d50.

In a preferred embodiment less than 2% of the total number of silicon-based particles have a particle size which is larger than twice the d50.

The same invention may alternatively be defined as a silicon-based powder for use in the negative electrode of a battery, whereby the silicon-based powder comprises silicon-based particles, and preferably consists of silicon-based particles, whereby the silicon-based particles have a number-based particle size distribution having a d50, whereby the particle size of a particle is considered to be the largest linear dimension of said particle, whereby less than 8.0% of the number of particles have a particle size which is larger than twice the d50, whereby preferably less than 6.0% of the number of particles have a particle size which is larger than twice the d50, whereby more preferably less than 5.0% of the number of particles have a particle size which is larger than twice the d50, whereby even more preferably less than 4.0% of the number of particles have a particle size which is larger than twice the d50, whereby even more preferably less than 3.0% of the number of particles have a particle size which is larger than twice the d50, whereby most preferably less than 2.0% of the number of particles have a particle size which is larger than twice the d50.

The same invention may alternatively be defined in another way as a silicon-based powder for use in the negative electrode of a battery, whereby the silicon-based powder comprises silicon-based particles, and preferably consists of silicon-based particles, whereby the silicon based particles have a number-based particle size distribution having a d50, whereby the particle size of a particle is considered to be the largest linear dimension of said particle, whereby the number of silicon-based particles having a particle size which is more than twice the d50, divided by the total number of silicon-based particles, is less than 0.080, preferably less than 0.060, more preferably less than 0.050, even more preferably less than 0.040, even more preferably less than 0.030 and most preferably less than 0.020.

The particle size distribution is preferably determined on a total number of particles of 500 or more.

The silicon-based particles may be observed via microscopic techniques, in particular SEM and possibly TEM, and their largest linear dimension, in other words, their size as used in this document, may be determined by automated image analysis. The largest linear dimension of a particle is the largest measurable straight-line distance between two points on the periphery of the particle.

For clarity it is remarked that the mentioned percentages concern the number of particles which are larger than twice the d50 value, not the weight that these particles represent. This is in line with the use of a number-based size distribution, wherein dx represents that x % of the total number of particles has a size equal to or smaller than d.

The silicon-based particles may have any shape, e.g. substantially spherical but also irregularly shaped, rod-shaped, plate-shaped etc.

In preferred embodiments the particle size distribution has a d10, whereby $(d50-d10)/d50 \leq 0.60$, and whereby preferably $(d50-d10)/d50 \leq 0.50$.

This limits the amount of very fine particles, which become very easily highly oxidised during preparation and/or use of the powder, thereby increasing the oxygen content of the powder. The oxygen content has a two-fold negative effect. Firstly, the weight of the powder increases by oxidation, and consequently also the weight of the battery, and secondly the oxidised silicon will lead to an irreversible consumption of lithium and thus a high initial irreversible capacity.

In a preferred embodiment said particle size distribution of the silicon-based particles has a d99, whereby $(d99-d50)/d50 \leq 2$.

In a preferred embodiment the silicon-based powder has an oxygen content of 1.5 wt % or more and of at most 20 wt %, and preferably of at most 15 wt %.

As explained above, an oxygen content which is too high will have negative effects in a battery.

Also, an oxygen content which is too low will have negative effects.

It is well known that a layer of $SiO_x$, with x<2, naturally forms around the silicon-based particles. The present inventors have discovered that this layer protects against excessive silicon carbide, SiC, formation during further processing, when the silicon-based powder is embedded in a carbon-containing matrix material and treated at high temperature, to make a practical active material powder. Such SiC formation prevents part of the silicon from acting electrochemically in a battery, and is further likely to form a diffusion barrier for lithium, thereby reducing the electrochemical performance of the silicon that is not converted into SiC.

In order to have its protective effect, sufficient oxygen in the form of $SiO_x$ needs to be present.

In a preferred embodiment the silicon-based powder has an oxygen content of 2.5 wt % or more, and in a further preferred embodiment of 3.5 wt % or more.

Preferably the particle size distribution has a d10, whereby d10>10 nm, and preferably d10>20 nm.

For clarity it is remarked that the silicon-based particles are normally nanosized, having a number based average diameter d50 which is less than 150 nm.

In a preferred embodiment the silicon-based particles have a chemical composition whereby the total of the silicon content, the oxygen content and the carbon content is at least 95% by weight.

In a preferred embodiment the silicon-based powder comprises at least 90% by weight, and preferably at least 95% by weight, of said silicon-based particles.

In a preferred embodiment the silicon-based particles have a chemical composition having at least 70% by weight of silicon, and preferably having at least 80% by weight of silicon.

For the avoidance of doubt, the following remarks are made:

the particle size of a particle is defined as the largest linear dimension of said particle. It will be clear to the skilled person that considering the overall size of the particles this largest linear dimension is ideally determined by electron microscopy, and that this requires that the particles are embedded in resin. Therefore it will be clear to the skilled person that the largest linear dimension of a particle is measured as the largest straight-line distance between two points on the periphery of the particle when embedded in resin as observed by electron microscopy of the embedded particle, It will be clear to the skilled person that the silicon-based powder has an oxygen content, and that the oxygen content may be determined by a variety of methods all giving, if executed correctly, the same result. As the skilled person will be aware, a widely used routine laboratory analysis is the determination of the oxygen content by reducing the silicon-based powder with graphite and measuring the amount of CO and $CO_2$ which is produced as a consequence of this reduction.

It will be clear to the skilled person that all powders, also the powders according to the invention, have a particle size distribution. Equally obvious to the skilled person is the fact that such a particle size distribution may be expressed as a number-based particle size distribution or a weight-based particle size distribution, or many other types of particle size distributions, and that a sample size needs to be sufficiently representative, for instance at least 500 particles in the case of a number based particle size distribution.

It will be clear to the skilled person that it is common in the technical field of particle technology to refer to important sizes of a particle size distribution as dx, for instance d10, d50, and d99, whereby in the case of a number-based particle size distribution dx represents the particle size at which x % of the total number of particles have a size equal to or smaller than dx.

The invention further concerns an active material powder for use in the negative electrode of a battery, whereby the active material powder comprises particles of active material, whereby the particles of active material comprise a matrix material and silicon-based particles, whereby the silicon based particles are embedded in the matrix material, whereby the silicon-based particles have a number-based particle size distribution having a d50, whereby the particle size of a silicon-based particle is considered to be the largest linear dimension of said silicon-based particle, whereby less than 8.0% of the silicon-based particles have a particle size which is larger than twice the d50, whereby preferably less than 6.0% of the silicon-based particles have a particle size which is larger than twice the d50.

In a preferred embodiment of the active material powder, less than 4.0% of the silicon-based particles have a size which is larger than twice the d50, whereby preferably less than 3.0% of the silicon-based particles have a size which is larger than twice the d50 and whereby more preferably less than 2.0% of the silicon-based particles have a size which is larger than twice the d50.

In a preferred embodiment of the active material powder, said particle size distribution of the silicon-based particles has a d10, whereby $(d50-d10)/d50 \leq 0.6$, whereby preferably $(d50-d10)/d50 \leq 0.5$.

In a preferred embodiment of the active material powder, said matrix material is a carbon-based matrix material, and is more preferably pitch or thermally decomposed pitch.

In a preferred embodiment of the active material powder, the active material powder comprises at least 90% by weight, and preferably at least 95% by weight, of said particles of active material.

In a preferred embodiment of the powder, the oxygen content of the active material powder is at most 10% by weight, preferably at most 5% by weight, and more preferably at most 4% by weight.

In a preferred embodiment of the active material powder, the d50 of the silicon-based particles is less than 150 nm and preferably less than 120 nm.

In a preferred embodiment of the active material powder said particle size distribution of the silicon-based particles has a d10, whereby this d10>10 nm, and whereby preferably this d10>20 nm.

In a preferred embodiment of the active material powder it comprises at least 20 wt % of said silicon-based powder, and at most 75 wt % of said silicon-based powder.

In a further preferred embodiment of the active material powder it comprises at least 30 wt % of said silicon-based powder.

The very narrow particle size distribution of the silicon-based powder according to the invention is important in this respect, because it allows for a better dispersion of the silicon-based powder in the matrix material than traditional silicon-based powders. Consequently, the silicon-based powder according to the invention enables higher concentrations to be used without having concentrated clusters of silicon-based particles which are badly embedded inside the particles of active material. Particles of active material containing large clusters of silicon-based particles will also swell more during lithiation than particles of active material containing well dispersed silico-based particles with a narrow particle size distribution.

The reason for this is believed to be that, contrary to powders with a wide particle size distribution, powders with a very narrow particle size distribution are less likely to form dense, and therefore strong, agglomerates before mixing with a matrix material, so that break-up of any agglomerates of silicon-based particles during mixing with a matrix material is much easier.

It is widely accepted due to thermodynamics that substantially all oxygen present in an active material powder made of silicon-based particles embedded in a carbon-based matrix material, is present in an oxidized layer at the surface of the silicon-based particles. This allows the recalculation of an oxygen content of the silicon-based particles inside an active material powder based on the overall oxygen content of the active material powder.

This oxidised layer is usually called a $SiO_x$ layer, with an average x value which is $0<x<2$, but may also include other atoms such as hydrogen, nitrogen or carbon. $SiO_x$ should therefore be properly understood as a Si-rich and O-rich layer in which Si has an oxidation state higher than 0 and on average smaller than 4+.

The invention further concerns a negative electrode for a battery, whereby the negative electrode comprises the silicon-based powder as defined above or the active material powder as defined above.

The invention further concerns a battery comprising the silicon-based powder as defined above or the active material powder as defined above, whereby preferably the battery has a negative electrode, whereby the silicon-based powder or the active material powder is present in the negative electrode.

The invention will be further explained by the following counterexample and example.

Analytical Methods Used

Determination of Oxygen Content

The oxygen contents of the powders in the examples and the counterexamples were determined by the following method, using a Leco TC600 oxygen-nitrogen analyzer. A sample of the powder was put in a closed tin capsule that was put itself in a nickel basket. The basket was put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.

Determination of Electrochemical Performance

The active material powders were sieved using a 45 μm sieve and mixed with carbon black, carbon fibres and sodium carboxymethyl cellulose binder in water (2.5 wt %). The ratio used was 93 weight parts active material powder/1 weight part carbon black/2 weight parts carbon fibres and 4 weight parts carboxymethyl cellulose (CMC).

These components were mixed in a Pulverisette 7 planetary ball mill for 30 minutes at 250 rpm.

A copper foil cleaned with ethanol was used as current collector. A 200 μm thick layer of the mixed components was coated on the copper foil. The coating was dried for 45 minutes in vacuum at 70° C. A 1.27 cm² circle was punched from the dried coated copper foil and used as an electrode in a coin cell using lithium metal as counter electrode. The electrolyte was 1M $LiPF_6$ dissolved in EC/DEC 1/1+2% VC+10% FEC solvents. All samples were tested in a coincell tester with high precision (Maccor 4000 series).

The coulombic efficiency of repeated charging and discharging cycles was determined at 0.5 C. The average coulombic efficiency of the cycles between the $5^{th}$ and $50^{th}$ cycle is reported The skilled person will be aware that a small difference in coulombic efficiency per cycle, will have, over the hundreds or thousands of charging-discharging cycles a battery is expected last, a significant cumulative effect.

Determination of Particle Size

The maximum sizes of silicon particles were determined by SEM imagery by measuring the largest measurable distance between two points on the periphery of a particle.

In order to be able to measure this, the powders were embedded in a resin of which a cross-section was taken.

To aid in the counting and size measurement image analysis software was used. To obtain reliable data, at least 500 particles were measured for each sample A number-based particle size distribution was subsequently determined from all measured particles in a sample.

COUNTEREXAMPLE 1, NOT ACCORDING TO THE INVENTION

A silicon nano powder was obtained by applying a 60 kW radio frequency (RF) inductively coupled plasma (ICP), using argon as plasma gas, to which a micron-sized silicon powder precursor was injected at a rate of circa 100 g/h, resulting in a prevalent (i.e. in the reaction zone) temperature above 2000K. In this first process step, the precursor became totally vaporized. In a second process step an argon flow of 10 $Nm^3$/h was used as quench gas immediately downstream of the reaction zone in order to lower the temperature of the gas below 1600K, causing a nucleation into metallic submicron silicon powder. Finally, a passivation step was performed at a temperature of 100° C. during 5 minutes by adding 100l/h of a $N_2/O_2$ mixture containing 1 mole % oxygen. The gas flow rate of the plasma was adjusted to obtain submicron silicon powder with an average particle diameter $d_{50}$ of 106 nm and a $d_{90}$ of 262 nm. In the present case 2.5 $Nm^3$/h Ar was used for the plasma gas.

The oxygen content was measured and was circa 8.0 wt %

In order to produce an active material powder, a blend was made of 16 g of the mentioned silicon nano powder and 32 g of petroleum-based pitch powder.

This was heated to 450° C. under $N_2$, so that the pitch melted, and, after a waiting period of 60 minutes, mixed for 30 minutes under high shear by means of a Cowles dissolver-type mixer operating at 1000 rpm.

The mixture of silicon nano powder in pitch thus obtained was cooled under $N_2$ to room temperature and, once solidified, pulverized and sieved on a 400 mesh sieve.

Synthetic battery grade graphite was added to the as-dried silicon nano powder/pitch blend by dry-mixing, to obtain a silicon nano powder/pitch/graphite mixture with a weight ratio of 1.0:2.0:7.6 respectively.

10 g of the obtained mixture was fired in a quartz boat in a tube furnace continuously flushed with argon and heated to 1000° C. at a heating rate of 3° C./min. The mixture was kept at 1000° C. for 2 h. The heating was turned off and the mixture was allowed to cool to room temperature under argon atmosphere. The product was removed from the quartz recipient, milled for 15 min in a coffee mill, and sieved on a 400 mesh sieve.

The active material powder produced had a silicon content of 10% by wt.

EXAMPLE 1 ACCORDING TO THE INVENTION

The same manufacturing method was used as in counterexample 1, except that the micron-sized silicon powder precursor was injected at a rate of 50 g/h, and the quench gas flow rate was 20 $Nm^3$/h.

The oxygen content of the obtained silicon nano powder was tested and was 9.3 wt %.

The obtained silicon nano powder was further used to form an active material powder following the same method as in counterexample 1.

EXAMPLES 2-7 ACCORDING TO THE INVENTION

The same manufacturing method was used as in example 1, except that the quench gas flow rates were varied between 15 $Nm^3$/h and 20 $Nm^3$/h and the micron-sized silicon powder precursor was injected at a rate of between 50 g/h and 75 g/h as shown in table 1.

TABLE 1

|  | Ex. 2 | Ex. 3 | Ex. 4 | Ex. 5 | Ex. 6 | Ex. 7 |
|---|---|---|---|---|---|---|
| Injection rate (g/h) | 50 | 50 | 60 | 60 | 75 | 75 |
| Quench flow ($Nm^3$/h) | 18 | 16 | 18 | 16 | 18 | 15 |

The oxygen contents of all products of examples 2-7 were measured and ranged between 8.0 wt % and 9.8 wt %.

The obtained silicon nano powders were further used to form an active material powder following the same method as in example 1 and counterexample 1.

Analysis

The particle size distributions of the silicon nano powders of the counterexample and the examples, just before being incorporated into the respective active material powders, were measured. The results are shown in table 2, below. The electrochemical performance of the respective active material powders was measured. The results are shown in table 3, below.

TABLE 2

| | Counter example 1 | Ex. 1 | Ex. 2 | Ex. 3 | Ex. 4 | Ex. 5 | Ex. 6 | Ex. 7 |
|---|---|---|---|---|---|---|---|---|
| | | | | particle size distributions of silicon nano powders | | | | |
| d10 (nm) | 38 | 43 | 45 | 55 | 52 | 54 | 53 | 64 |
| d50 (nm) | 106 | 86 | 87 | 104 | 103 | 104 | 107 | 104 |
| d90 (nm) | 262 | 128 | 137 | 176 | 173 | 180 | 193 | 171 |
| d95 (nm) | 344 | 139 | 156 | 203 | 201 | 214 | 230 | 192 |
| d99 (nm) | 469 | 177 | 202 | 279 | 269 | 289 | 309 | 257 |
| percentage of particles, larger than two times d50 | 16.1% | 1.4% | 2.8% | 4.1% | 4.5% | 5.8% | 6.6% | 2.9% |

TABLE 3 electrochemical performance of active material powders

| Product | Coulombic efficiency, cycle 1 (%) | Coulombic efficiency, average of cycles 5 to 50 (%) |
|---|---|---|
| Counterexample 1 | 88.7 | 99.74 |
| Example 1 | 85.5 | 99.90 |
| Example 2 | 86.5 | 99.84 |
| Example 3 | 88.3 | 99.82 |
| Example 4 | 88.4 | 99.81 |
| Example 5 | 88.6 | 99.79 |
| Example 6 | 89.7 | 99.79 |
| Example 7 | 89.0 | 99.83 |

A clear correlation between the percentage of particles larger than two times d50, and the electrochemical performance is observed, whereby the silicon powders with a lower percentage of particles larger than two times d50 lead to active material powders having a superior performance.

EXAMPLES 8-13 ACCORDING TO THE INVENTION

The same manufacturing method was used as in example 1, except that the passivation step was performed at a temperature of 100° C. during 0.5-15 minutes by adding 100l/h of a $N_2/O_2$ mixture containing 0.1-1 mole % oxygen. Hereby the oxygen content of the powders could be varied as shown in table 4, below.

All samples showed a particle size distribution with d10, d50, d90, d95 and d99 values comparable to Example 1.

The obtained silicon nano powders were further used to form an active material powder following the same method as in example 1

As shown in table 4 the oxygen content of the silicon powders, before integration in the active material powder, decreased from 14.1 wt % in Example 8, down to 1.6 wt % in Example 13. SiC contents were measured by XRD spectroscopy. The XRD pattern was first fitted using the "Default Profile Fit" of the fitting function of the software (Panalytical HighScore Plus). The areas of the main peak attributed to silicon (111 at ~28.4° $2\theta_{Cu}$) and the main peak attributed to SiC (111 at ~35.7° $2\theta_{Cu}$) were calculated automatically by the software and a ratio of both peak areas (peak area SiC/peak area Si) was calculated. For all samples 1 to 8 this resulted in values between 1% and 10%.

The electrochemical performance was measured in a similar way as in Example 1, resulting in high 1$^{st}$ coulombic efficiency values and maintaining also high average coulombic efficiency values, the latter one indicating a good cycle life as shown in the table.

COUNTEREXAMPLE 2

The same manufacturing method as in example 1 was used, except that the passivation step was performed at a temperature of 200° C. during 15 minutes by adding 100l/h of a $N_2/O_2$ mixture containing 1 mole % oxygen. This resulted in an oxygen content of 23 wt %.

The obtained silicon nano powder was further used to form an active material powder following the same method as in example 1. SiC content in the final active material powder was measured and was below the detection limit of 0.5%.

Electrochemical testing shows lows' Coulombic efficiency value of 82.0%, which indicates lot of lithium loss during the first cycle.

COUNTEREXAMPLE 3

The same manufacturing method was used as in example 1, except that the passivation step was performed at a temperature of 100° C. during 12 seconds by adding 100l/h of a $N_2/O_2$ mixture containing 0.1 mole % oxygen. This resulted in an oxygen content of 1.0 wt %. The obtained silicon nano powder was further used to form an active material powder following the same method as in example 1. A very high XRD peak ratio of SiC compared to Si of 20% was measured.

A good 1$^{st}$ Coulombic efficiency value of 88.0 was measured and a reasonable average coulombic efficiency of 99.80% was seen, but a very low silicon capacity of circa 2300 mAh/g Si was measured, which is significantly less than theoretical value of 3579 mAh/g Si, whereas the examples showed a silicon capacity of between 2900 and 3200 mAh/g Si.

TABLE 4

| | Ex. 1 | Ex. 8 | Ex. 9 | Ex. 10 | Ex. 11 | Ex. 12 | Ex. 13 | Counter Ex 2 | Counter Ex 3 |
|---|---|---|---|---|---|---|---|---|---|
| Passivation temp (° C.) | 100 | 100 | 100 | 100 | 100 | 100 | 100 | 200 | 100 |
| Passivation time (min) | 5 | 8 | 1 | 5 | 3 | 2 | 1 | 15 | 0.2 |

TABLE 4-continued

|  | Ex. 1 | Ex. 8 | Ex. 9 | Ex. 10 | Ex. 11 | Ex. 12 | Ex. 13 | Counter Ex 2 | Counter Ex 3 |
|---|---|---|---|---|---|---|---|---|---|
| Mole % oxygen in N2/O2 mixture | 1 | 1 | 1 | 0.1 | 0.1 | 0.1 | 0.1 | 1 | 0.1 |
| Measured oxygen in Silicon powder (wt %) | 9.3 | 14.1 | 6.1 | 3.9 | 3.5 | 2.7 | 1.6 | 23 | 1.0 |
| Coulombic efficiency, cycle 1 (%) | 85.5 | 84.5 | 86.3 | 87.9 | 88.5 | 88.7 | 89.0 | 82.0 | 88.0 |
| Average coulombic efficiency | 99.90 | 99.89 | 99.90 | 99.91 | 99.91 | 99.91 | 99.90 | 99.88 | 99.80 |

EXAMPLES 14-17 ACCORDING TO THE INVENTION

The same manufacturing method of silicon and the active material powder was used as in example 1. Silicon content in the active material powder was increased to 20 wt %, 30 wt %, 40 wt % and 50 wt % as shown in table 5.

All samples showed an oxygen content and silicon particle size distribution with d10, d50, d90, d95 and d99 values comparable to Example 1.

The obtained silicon nano powder was further used to form an active material powder following the same method as in example 1. However, silicon contents were increased to respectively 40 wt % (counter example 4) and 50 wt % (counter example 5) as shown in table 5 below. Electrochemical performances were measured in coin cells as in Example 1 and Counter example 1. However, in order to compare results, the active material powder was diluted with graphite to reach a total silicon content of 10 wt % in the coin cell.

As shown in table 5 this resulted in a very low $1^{st}$ coulombic efficiency values of 81.1% and 80.2%.

TABLE 5

|  | Ex. 1 | Ex. 14 | Ex. 15 | Ex. 16 | Ex. 17 | Counter Ex 4 | Counter Ex 5 |
|---|---|---|---|---|---|---|---|
| Oxygen content silicon particles | 9.3 | 9.3 | 9.3 | 9.3 | 9.3 | 23 | 23 |
| Silicon content in active material powder (wt %) | 10 | 20 | 30 | 40 | 50 | 40 | 50 |
| Oxygen content in active material powder (wt %) | 0.9 | 1.5 | 2.1 | 2.7 | 4.4 | 7.2 | 8.2 |
| Coulombic efficiency cycle 1 (%) | 85.5 | 85.7 | 86.2 | 85.8 | 85.6 | 81.1 | 80.2 | as in example 1. However, silicon contents were increased to respectively 20 wt % (Ex 14), 30 wt % (Ex 15), 40 wt % (Ex 16) and 50 wt % (Ex 16).

Electrochemical performances were measured in coin cells as in Example 1 and Counter example 1. However, in order to compare results, the active material powder was diluted with graphite to reach a total silicon content of 10 wt % in the coin cell. As shown in table 5 this resulted in excellent $1^{st}$ coulombic efficiency values of 85% and higher and maintaining good electrochemical average coulombic efficiency values.

COUNTEREXAMPLES 4-5 NOT ACCORDING TO THE INVENTION

The same manufacturing method of silicon and the active material powder was used as in counter example 2. The sample showed an oxygen content and silicon particle size distribution with d10, d50, d90, d95 and d99 values comparable to counterexample 2.

EXAMPLES 18-19 ACCORDING TO THE INVENTION

The same manufacturing method of silicon and active material powder was used as in example 1. Both samples showed an oxygen content and silicon particle size distribution with d10, d50, d90, d95 and d99 values comparable to Example 1.

The obtained silicon nano powder was further used to form an active material powder by following method: The silicon powder was loaded in an attritor of 4 liters together with micron-sized $FeSi_2$ iron silicon alloy. Two different experiments were done by using respectively 25 wt % silicon nano powder and 75% $FeSi_2$ (Example 18) and 40 wt % silicon nano powder and 60 wt % $FeSi_2$ (Example 19).

Note that due to the fact that the silicon in $FeSi_2$ is alloyed with iron it does not have any significant electrochemical activity. It is instead only used as a matrix material for the nano-sized silicon powder.

Both materials were milled in an inert argon atmosphere for 24 days at 84 rpm together with heptane as PCA at 85% filling ratio. After 24 days milling, the product was cooled to room temperature. Finally, a passivation step was performed at a temperature of 100° C. during 5 minutes by adding 100l/h of a $N_2/O_2$ mixture containing 1 mole % oxygen.

Electrochemical performances were measured in coin cells as in Example 14-17. As shown in table 6 this resulted in excellent $1^{st}$ Coulombic efficiency values of 85% and higher and maintaining good electrochemical average coulombic efficiency values.

TABLE 6

| | Ex 18 | Ex 19 |
|---|---|---|
| Oxygen content silicon nano-powder | 9.3 | 9.3 |
| Silicon nano-powder content in active material powder (wt %) | 25 | 40 |
| Oxygen content in active material powder (wt %) | 2.4 | 4.1 |
| Coulombic efficiency cycle 1 (%) | 86.7 | 86.1 |
| Average coulombic efficiency (%) | 99.89 | 99.90 |

The invention claimed is:

1. A silicon-based powder for use in a negative electrode of a battery, the silicon-based powder comprising silicon-based particles, wherein the silicon-based particles have a number-based particle size distribution having a d50, wherein a particle size of a particle is considered to be a largest linear dimension of said particle, wherein less than 8.0% of a total number of silicon-based particles have a particle size that is larger than twice the d50, and wherein the silicon-based powder has an oxygen content of 1.5 wt % or more and 8.0 wt % or less.

2. The silicon-based powder according to claim 1, wherein the largest linear dimension of a particle is measured as the largest straight-line distance between two points on a periphery of the particle when embedded in resin as observed by electron microscopy of an embedded particle, wherein said oxygen content of the powder is determined by reducing the silicon-based powder with graphite and measuring an amount of CO and $CO_2$ that is produced as a consequence of this reduction, wherein the number-based particle size distribution is determined based on the particle sizes of at least 500 particles, wherein the number-based particle size distribution has a d10, wherein d10 represents that 10% of the total number of particles have a size equal to or smaller than d10, wherein the number-based particle size distribution has a d50, wherein d50 represents that 50% of the total number of particles have a size equal to or smaller than d50, and wherein the number-based particle size distribution has a d99, wherein d99 represents that 99% of the total number of particles have a size equal to or smaller than d99.

3. The silicon-based powder according to claim 1, wherein less than 4.0% of the total number of silicon-based particles has a particle size that is larger than twice the d50.

4. The silicon-based powder according to claim 1, wherein the silicon based powder has an oxygen content of 2.5 wt % or more.

5. The silicon based powder according to claim 1, wherein the silicon based powder has an oxygen content of 1.5 wt % or more and 6.1 wt % or less.

6. The silicon based powder according to claim 1, wherein the particle size distribution of the silicon-based particles has a d99, wherein (d99−d50)/d50≤2.

7. The silicon-based powder according to claim 1, wherein the silicon-based particles have a chemical composition having at least 70% by weight of silicon.

8. The silicon-based powder according to claim 1, wherein d50<150 nm.

9. The silicon-based powder according to claim 1, wherein the particle size distribution has a d10, wherein d10>10 nm.

10. An active material powder for use in a negative electrode of a battery, wherein the active material powder comprises active material particles, wherein the active material particles comprise a matrix material and a silicon-based powder according to claim 1, wherein the silicon-based powder is embedded in the matrix material.

11. The active material powder according to claim 10, wherein the active material powder comprises at least 20 wt % of said silicon-based powder.

12. The active material powder according to claim 11, wherein the active material powder comprises at most 75 wt % of said silicon-based powder.

13. The active material powder according to claim 10, wherein the active material powder comprises at least 90% by weight of said active material particles.

14. A negative electrode for a battery, wherein the negative electrode comprises the silicon-based powder of claim 1.

15. A battery comprising the silicon-based powder of claim 1.

* * * * *